US010280995B2

(12) United States Patent
Lethorn et al.

(10) Patent No.: US 10,280,995 B2
(45) Date of Patent: May 7, 2019

(54) REINFORCED CALIPER HOUSING

(71) Applicant: Akebono Brake Industry Co., Ltd., Chuo-ku, Tokyo (JP)

(72) Inventors: Brad Robert Lethorn, Northville, MI (US); Scott Alan Dubay, Clinton Township, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 175 days.

(21) Appl. No.: 15/399,319

(22) Filed: Jan. 5, 2017

(65) Prior Publication Data

US 2018/0187730 A1 Jul. 5, 2018

(51) Int. Cl.
*F16D 65/00* (2006.01)
*F16D 55/228* (2006.01)
*F16D 55/00* (2006.01)

(52) U.S. Cl.
CPC ....... *F16D 65/0068* (2013.01); *F16D 55/228* (2013.01); *F16D 2055/0016* (2013.01)

(58) Field of Classification Search
CPC .............. F16D 65/0068; F16D 55/226; F16D 2055/0016; F16D 2055/0091; F16D 2055/002

See application file for complete search history.

(56) References Cited

U.S. PATENT DOCUMENTS

| | | | | |
|---|---|---|---|---|
| 3,261,429 A | * | 7/1966 | Burnett | F16D 55/228 188/72.5 |
| 3,611,988 A | * | 10/1971 | Hess | F16D 65/095 188/250 B |
| 3,730,306 A | * | 5/1973 | Rath | F16D 55/22 188/345 |
| 5,002,160 A | * | 3/1991 | Weiler | F16D 55/228 188/264 AA |
| 5,343,985 A | | 9/1994 | Thiel et al. | |
| 5,558,183 A | * | 9/1996 | Way | F16D 65/853 188/264 CC |
| 6,250,439 B1 | | 6/2001 | Matsuzaki | |
| 7,766,132 B2 | | 8/2010 | Veneziano et al. | |

(Continued)

FOREIGN PATENT DOCUMENTS

| | | |
|---|---|---|
| CN | 103851111 A | 6/2014 |
| EP | 2738414 A2 | 6/2014 |

(Continued)

*Primary Examiner* — Xuan Lan Nguyen
(74) *Attorney, Agent, or Firm* — The Dobrusin Law Firm, P.C.; Daniela M. Thompson-Walters

(57) ABSTRACT

A brake caliper housing having: an inner body having one or more inner piston bores open toward a rotor gap; an outer body having: one or more outer piston bores open toward the rotor gap, a bridge structure which extends over the rotor gap, and a plurality of reinforcing structures included in the bridge structure; wherein a longitudinal plane passes through both the inner body and the outer body; wherein the plurality of reinforcing structures extend at an angle away from the longitudinal plane as the plurality of reinforcing structures extend from an exterior surface of the outer body over the rotor gap; and wherein one or more bridge fasteners parallel to the longitudinal plane secure the bridge structure to the inner body so that the bridge structure connects the outer body to the inner body.

20 Claims, 6 Drawing Sheets

(56) References Cited

U.S. PATENT DOCUMENTS

| | | | |
|---|---|---|---|
| 8,485,323 B2 * | 7/2013 | Narayanan V | F16D 55/227 |
| | | | 188/250 B |
| 8,701,841 B2 * | 4/2014 | Crippa | F16D 55/228 |
| | | | 188/370 |
| 8,701,847 B2 | 4/2014 | Crippa et al. | |
| 9,181,999 B2 | 11/2015 | Scotti et al. | |
| 9,291,224 B2 | 3/2016 | Crippa et al. | |
| 2014/0158483 A1 | 6/2014 | Miyahara et al. | |
| 2015/0027822 A1 | 1/2015 | Cerutti et al. | |

FOREIGN PATENT DOCUMENTS

| | | |
|---|---|---|
| GB | 2250554 A | 6/1992 |
| JP | 1228224 S | 1/2005 |
| JP | 2014109317 A | 6/2014 |
| WO | 2014/091423 A2 | 6/2014 |

* cited by examiner

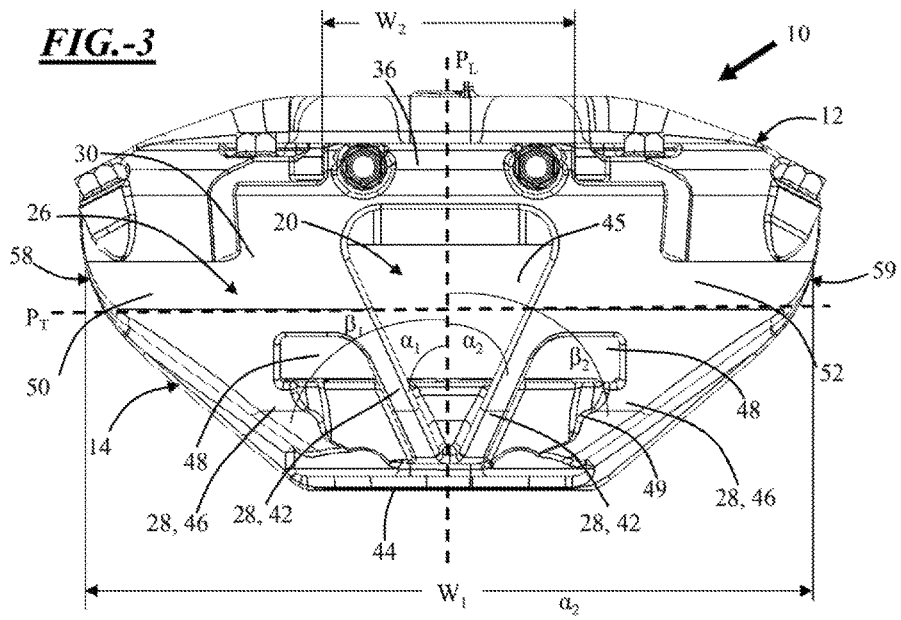

REINFORCED CALIPER HOUSING

FIELD

The present teachings generally relate to a caliper housing and more particularly to a caliper housing for an opposed piston type disc brake. The caliper housing includes a bridge structure with a plurality of reinforcing structures. The reinforcing structures provide structural rigidity to the caliper housing which may be particularly useful in reducing vibration and noise produced during braking.

BACKGROUND

Disc brakes are widely used for braking applications in automobiles. A disc brake generally includes a caliper and a rotor. The rotor may be connected to a wheel and/or axle, so the rotor rotates with the wheel. A style of caliper may be an opposed piston caliper. An opposed piston caliper generally includes opposing pistons within opposing piston bores facing opposing surfaces of the rotor. Typically, the opposing pistons are placed so that one or more inner pistons face an inner side surface of a rotor and one or more outer pistons face an outer side surface of the rotor. The one or more inner pistons are in communication with one or more inner brake pads and the one or more outer pistons are in communication with one or more outer brake pads. A braking force may be generated by depressing a vehicle pedal, causing brake fluid to flow into the opposing piston bores which increases pressure on the pistons to result in actuation. Upon actuation, the pistons move toward the rotor, thus squeezing the brake pads against the rotor to create a braking force to either slow or stop rotation of the rotor. Exemplary caliper housings are disclosed in U.S. Pat. Nos. 5,343,985; 7,766,132; 8,701,847; 9,291,224; US Patent Publication No. 2014/0158483; and PCT Publication No. WO 2014/091423; all of which are expressly incorporated herein by reference for all purposes.

Although opposing pistons may be advantageous in providing a stable braking force, some opposed piston calipers may present problems with vibrations, brake squeal, heat displacement, and/or manufacturability. When a braking force is created, a reaction force opposite the braking force is also created. The reaction force may displace the outer body relative to the inner body or vice-versa. This displacement may result in vibrations of the opposing piston caliper. These vibrations may produce a low frequency brake squeal heard within an interior of a vehicle. Additionally, when the brake force is created, the friction generated between the rotor and the brake pads may generate an intense heating of the rotor. If the resulting heat is not sufficiently dissipated, the heat may melt the brake pads and/or the heat may transfer through the pistons to overheat, and even boil, the brake fluid.

It would be desirable to have a bridge structure connecting a multi-piece opposed piston caliper which provides structural reinforcement as in a monoblock opposed piston caliper, while simultaneously allowing for tooling access into the interior of the opposed piston caliper. It would be advantageous to include a reinforcement structure as part of the bridge structure which is able to provide structural rigidity to the caliper housing, thus reducing or preventing displacement of an outer body relative to an inner body. It is also desirable to include sufficient openings in the bridge structure to allow for heat dissipation when a braking force is created but do not interfere with a reinforcing structure to provide sufficient structural integrity to the caliper housing. It would also be beneficial to have a multi-piece caliper housing which provides for the weight reduction benefits of a monoblock caliper housing.

SUMMARY

The present disclosure relates to a brake caliper housing comprising: (a) an inner body having one or more inner piston bores open toward a rotor gap; (b) an outer body having: (i) one or more outer piston bores open toward the rotor gap; (ii) a bridge structure which extends over the rotor gap; and (iii) a plurality of reinforcing structures included in the bridge structure; wherein a longitudinal plane passes through both the inner body and the outer body; wherein the plurality of reinforcing structures extend at an angle away from the longitudinal plane as the plurality of reinforcing structures extend from an exterior surface of the outer body over the rotor gap; and wherein one or more bridge fasteners parallel to the longitudinal plane secure the bridge structure to the inner body so that the bridge structure connects the outer body to the inner body.

The present disclosure relates to a brake caliper housing comprising: (a) an inner body having one or more inner piston bores open toward a rotor gap; (b) an outer body having: (i) one or more outer piston bores open toward the rotor gap; (ii) a bridge structure which extends over the rotor gap; and (iii) a plurality of reinforcing structures included in the bridge structure; wherein a longitudinal plane passes through both the inner body and the outer body; wherein the bridge structure includes at least two ribs which extend from an exterior surface of the outer body toward the inner body and diverge away from one another at an acute angle relative to the longitudinal plane; wherein the at least two ribs extend only partially over the rotor gap; and wherein one or more bridge fasteners parallel to the longitudinal plane secure the bridge structure to the inner body so that the bridge structure connects the outer body to the inner body.

The present disclosure relates to a brake assembly comprising: (a) at least one outer piston and at least one inner piston; (b) a rotor; (c) a brake caliper housing comprising: (i) an inner body having at least one inner piston bore open toward a rotor gap, wherein the at least one inner piston resides within the at least one inner piston bore and the rotor is at least partially received within the rotor gap; (ii) an outer body having: at least one outer piston bore open toward the rotor gap, wherein the at least one outer piston resides within the at least one outer piston bore; and a bridge structure which is an integral part of the outer body, extends over the rotor gap, and connects the inner body to the outer body; wherein a longitudinal plane passes through both the inner body and the outer body; wherein the bridge structure includes a plurality of reinforcing structures which angle away from the longitudinal plane as the plurality of reinforcing structures extend from an exterior surface of the outer body over the rotor gap; and wherein the plurality of reinforcing structures extend only partially over the rotor gap.

The present disclosure provides a caliper housing which includes a bridge structure connecting an outer body to an inner body, the bridge structure having a plurality of reinforcing structures. The plurality of reinforcing structures may provide structural reinforcement during creation of a braking force. By providing structural reinforcement, the plurality of reinforcing structures may reduce or prevent displacement of the outer body relative to the inner body, thereby limiting vibrations and preventing low frequency brake squeal. The bridge structure may be integral with the outer body and fastened to the inner body, thus allowing each body to be individually manufactured while providing structural rigidity similar to a monoblock caliper housing. The bridge structure may include one or more through-holes to provide for a light weight housing, which may be comparable with the weight of a monoblock caliper housing. A combination of a plurality of reinforcing structures with one or more through-holes may allow for structural reinforcement about the rotor between the inner body and outer body, while providing for heat dissipation of the heat generated from the rotor and pad surfaces into surrounding air.

BRIEF DESCRIPTION OF DRAWINGS

FIG. 3 is a top plan view of a caliper housing.
FIG. 4 is a cross-sectional view of a caliper housing cut along line A-A as shown in FIG. 2.

DETAILED DESCRIPTION

Figures 1, 2:
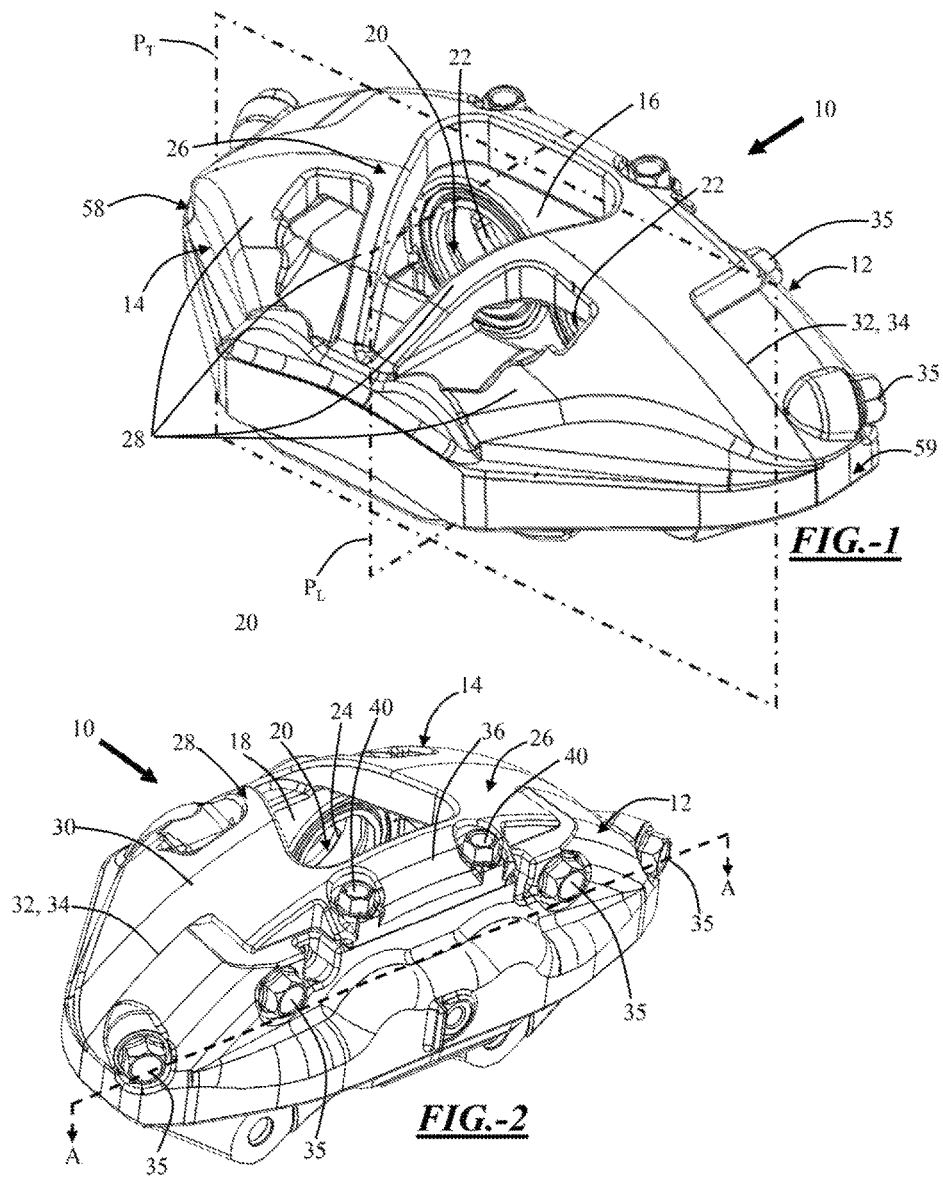
FIG. 1 is a front perspective view of a caliper housing.
FIG. 2 is a rear perspective view of a caliper housing.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present disclosure generally provides a brake assembly and caliper housing for use with vehicles. The brake assembly and caliper housing may be used with almost any vehicle. A vehicle may include a car, truck, bus, train, airplane, motorcycle, or the like. Alternatively, the brake assembly and or the caliper housing may be integrated into components used for manufacturing or other equipment requiring a brake. Components may include a lathe, winder for paper products or cloth, amusement park rides, turbines, wind turbines, or the like. However, the present disclosure may be found particularly suitable for use with passenger vehicles. Passenger vehicles may include a car, truck, sports utility vehicle, or the like. A brake assembly may be understood as a disc brake, hydraulic brake, electronic brake, electromechanical brake, the like, or any combination thereof. The present disclosure may find particular use in a disc brake assembly. A disc brake assembly may include an opposed piston type disc brake.

Generally, a brake assembly includes a rotor and a caliper housing. The caliper housing includes an inboard friction material and an outboard friction material on opposing sides of the rotor. The friction material may be part of a brake pad. The caliper housing may include at least one piston bore in which at least one brake piston may be housed. The piston bore may include a fluid inlet, a closed wall, a front opening, and a cylindrical side wall which includes an annular groove (i.e., seal groove) located near the front opening. A seal may be located about the annular groove to form an interference fit with the brake piston. The fluid inlet may be in the closed wall and may be in fluid communication with the master cylinder. The fluid inlet may allow for brake fluid to enter the piston bore so that the brake piston is moved towards the front opening. The piston may be moved by the brake fluid or may be mechanically moved, such as by an actuator or driver (e.g., a rotary to linear actuator). The front opening may allow the brake fluid to move the piston towards the front opening and into contact with the friction material. The friction material may then be moved into contact with the rotor so that the braking force is created.

The brake assembly may include a rotor. The rotor may slow down or stop rotation of a wheel and/or axle. The rotor may have a general disc shape. The rotor includes one or more surfaces which receive the braking force. The rotor includes opposing braking surfaces. The opposing braking surfaces may include an inner surface and an outer surface. The rotor may be solid, hollow, or a combination of both. The rotor may define a rotational axis.

The rotor may rotate about a rotational axis. The rotational axis may function to allow the rotor to rotate co-axially with a wheel and/or axle. The rotational axis may be co-axial with a rotational axis of a vehicle wheel and/or axle. The rotational axis may be generally parallel, perpendicular, or any angle therebetween relative to one or more interior surfaces of one or more bodies, opposing surfaces of the rotor, one or more planes of a caliper housing, actuation movement of one or more pistons, one or more axis of one or more piston bores, or any combination thereof. For example, the rotational axis may be generally perpendicular to opposing surfaces of the rotor, one or more interior surfaces of one or more bodies, or both. The rotational axis may be generally parallel with one or more axis of one or more piston bores, actuation movement of one or more pistons, or both.

A rotational axis may define a radial direction. The radial direction may function to define structural relationships of one or more portions of the caliper housing, brake assembly, or both. The radial direction may be generally parallel, perpendicular, or any angle therebetween relative to a rotational axis, one or more interior surfaces of one or more bodies, opposing surfaces of the rotor, one or more planes, or any combination thereof. The radial direction may be generally perpendicular to the rotational axis of the rotor. The radial direction may be generally parallel with one or more interior surfaces of one or more bodies, opposing surfaces of the rotor, or both. The radial direction may define a radial outward direction. A radial outward direction may be defined as a direction which follows away from the rotational axis of the rotor. The radial outward direction may follow away from the rotational axis in the radial direction. One or more portions of a caliper housing may be located radially outward from the rotational axis.

The present teachings relate to a caliper housing. The caliper housing may function to house one or more braking components. Exemplary braking components may include one or more piston bores, pistons, friction material, a rotor, brake fluid, or any combination thereof. The caliper housing may be a unitary housing (e.g., one-piece, monoblock) or a multi-piece housing. The caliper housing may include one or more bodies, one or more bridge structures, one or more reinforcing structures, one or more through-holes, one or more fasteners, one or more fastener bores, a rotor gap, or any combination thereof. One or more bodies may be located on opposing sides of a rotor gap, a rotor, or both. The caliper housing may have opposing sides. The opposing sides may be sides of a caliper housing where one or more bodies mate with one or more other bodies. The caliper housing may have an outer periphery. The outer periphery may be defined by one or more exterior surfaces of the caliper housing. An outer periphery of the caliper housing, taken along a cross-section, may have a general geometric shape. The cross-section shape of the outer periphery may be generally ovular, elliptical, circular, triangular, square, rectangular, trapezoidal, the like, or any combination thereof. The cross-section of the outer periphery may be taken along one or more planes of the caliper housing. The one or more planes may include a longitudinal plane, transverse plane, or a plane parallel and/or perpendicular with either the longitudinal plane or transverse plane. For example, the outer periphery of the caliper housing may have a generally trapezoid-like shape at a cross-section taken along a plane perpendicular with both the transverse and longitudinal planes of the caliper housing.

The caliper housing may define one or more planes. The one or more planes may function to describe the location of one or more portions of the caliper housing, brake assembly, or both relative to one or more other portions. One or more planes may include a longitudinal plane; a transverse plane; one or more planes perpendicular, parallel, or any angle therebetween relative to the longitudinal plane and/or transverse plane; or any combination thereof. One or more planes may be parallel, perpendicular, or any angle therebetween relative to one or more interior surfaces of one or more bodies, opposing surfaces of a rotor, a rotational axis, an axis of one or more pistons, or any combination thereof. A longitudinal plane may intersect and/or be generally perpendicular with one or more bodies, interior surfaces of one or more bodies, a rotor, opposing surfaces of a rotor, a rotor gap, or any combination thereof. The longitudinal plane may be parallel with a rotational axis, an axis of one or more pistons, or both. A transverse plane may be substantially perpendicular with one or more other planes. A transverse plane may be substantially perpendicular with the longitudinal plane. A transverse plane may be substantially parallel with one or more interior surfaces of one or more bodies, opposing surfaces of a rotor, or both. A transverse plane may lie within the rotor gap. A transverse plane may lie within a rotor between opposing surfaces, without passing through the opposing surfaces.

The caliper housing includes one or more bodies. One or more bodies may include a single body (e.g. monoblock), a plurality of integral bodies (e.g., monoblock), or a plurality of connected bodies (multi-piece). One or more bodies may function to house one or more pistons, mount the caliper housing, partially enclose a rotor, seal in a fluid, or any combination thereof. The one or more bodies may have any size, shape, and or configuration to allow one or more pistons to be actuated toward a rotor to create a braking force. The one or more bodies may be located adjacent and/or opposing one or more surfaces of a rotor. An inner body may be located adjacent and opposing an inner surface of a rotor and an outer body may be located adjacent and opposing an outer surface of a rotor. The one or more bodies may be generally symmetric or asymmetric with one or more other bodies. Symmetry may be measured about one or more planes. One or more bodies may be asymmetric with one or more other bodies to provide a light weight caliper housing. For example, an outer body may have a smaller cross-sectional area than an inner body. The cross-sectional area may be taken along one or more planes perpendicular to both a transverse plane and a longitudinal plane. One or more bodies may include one or more piston bores, house one or more pistons, one or more bridge structures, one or more through-holes, one or more mating surfaces, one or more interior surfaces, one or more exterior surfaces, one or more fasteners, one or more fastener bores, one or more mounting bores, or any combination thereof. One or more interior surfaces may be defined as surfaces facing toward a rotor gap, rotor, having one or more piston bores, or any combination thereof. One or more interior surfaces may be opposing one or more other interior surfaces. For example, an interior surface of an inner body may be distanced from and opposing an interior surface of an outer body.

The caliper housing includes a rotor gap. The rotor gap functions to house a rotor. The rotor gap may be formed by a distance between opposing surfaces of a caliper housing. Opposing surfaces may include opposing interior surfaces. The interior surfaces may be interior surfaces of one or more bodies. One or more bodies may include an inner body and an outer body. A bridge structure may be located radially outward from the rotor gap. The rotor gap may be in communication with an external environment via one or more portions of the bridge structure. One or more portions of the bridge structure may include one or more through-holes. One or more piston bores may face toward the rotor gap.

The caliper housing may include one or more piston bores. The one or more piston bores may function to house one or more pistons, provide a seal for a brake fluid, transfer a brake apply force to one or more pistons, or any combination thereof. The one or more piston bores may be located on any portion of the caliper housing which allows a piston bore to house one or more pistons so the one or more pistons may be actuated toward a rotor. The one or more piston bores may include a single piston bore or a plurality of piston bores. Each body of the caliper housing may include one or more piston bores, two or more piston bores, three or more piston bores, or even four or more piston bores. Each body of the caliper housing may include ten or less piston bores, eight or less piston bores, or even six or less piston bores. Each body of the caliper housing may have an equal or differing number of piston bores as an opposing body of the caliper housing. One or more piston bores may be generally opposing one or more other piston bores. One or more piston bores may be co-axial or axially off-set with one or more other piston bores. The one or more piston bores may include a fluid inlet, a closed wall, a front opening, a cylindrical side wall, and/or an axis. A front opening facing toward the rotor gap may be located in an interior surface of one or more bodies. The front opening may have an outer circumference at the interior surface. Opposing the front opening may be a closed wall. The closed wall may be connected to the front opening via a cylindrical wall. A fluid inlet may be in the closed wall. An axis of the one or more piston bores may be perpendicular to opposing surfaces of a rotor, one or more interior surfaces of a caliper housing, a transverse plane, or any combination thereof. The axis may be parallel with a rotational axis of a rotor, a longitudinal plane of the caliper housing, or both. The one or more piston bores may be located radially outward from a rotational axis. The one or more piston bores may be located radially between a rotational axis and one or more mating surfaces, one or more fastener bores, one or more fasteners, a bridge structure, one or more sides of a caliper housing, or any combination thereof.

The one or more bodies may have one or more mating surfaces. The one or more mating surfaces may include a single mating surface or a plurality of mating surfaces. The one or more mating surfaces may function to cooperate with one or more other mating surfaces, one or more fasteners, one or more bodies, one or more fastener bores, or any combination thereof to mate one or more bodies with one or more other bodies. One or more mating surfaces may lie in one or more planes. One or more planes may be a single plane or a plurality of planes. One or more mating surfaces may be generally planar. The single plane may be generally parallel or perpendicular with a longitudinal plane or a transverse plane of the caliper housing. One or more mating surfaces may abut one or more other mating surfaces. One or more mating surfaces of one body may abut with one or more mating surfaces of another body. For example, one or more mating surfaces of an inner body may abut with one or more mating surfaces of an outer body. One or more mating surfaces may be substantially flush with one or more other mating surfaces. One or more mating surfaces may be maintained abutting and/or flush with one or more other mating surfaces with one or more fasteners. One or more mating surfaces may include one or more fastener bores passing therethrough. One or more mating surfaces may be aligned with one or more other mating surfaces. Aligned may include having one or more fastener bores of one mating surface aligned with one or more fastener bores of another mating surface, so a fastener may pass through. One or more mating surfaces may be located radially outward from one or more piston bores, one or more mounting bores, a rotor gap, a rotor, an interior surface, or any combination thereof.

The caliper housing includes a bridge structure. The bridge structure may function to connect one or more bodies of the caliper housing to one or more other bodies of the caliper housing. The bridge structure may have any size or shape to connect one or more bodies of a caliper housing with one or more other bodies of a caliper, extend over a rotor gap, or both. The bridge structure may include one or more mating surfaces. The one or more mating surfaces of the bridge structure may abut and/or be flush with one or more other mating surfaces of one or more bodies. The bridge structure may be located radially outward from one or more piston bores, an interior surface of a rotor, a rotor gap, or both. The bridge structure may be integral with or attached to one or more bodies of a caliper housing. For example, in a monoblock caliper, the bridge structure may be integral with both an inner body and outer body of a caliper housing. For example, in a two-piece caliper, the bridge structure may be integrally formed with the inner body or outer body; affixed via a fastener to an inner body or outer body, or both. By only being integral with one of the one or more bodies, the bridge structure may allow access into an interior of the caliper housing during manufacturing and assembly. The bridge structure may extend from one or more bodies to one or more other bodies. For example, the bridge structure may extend from an outer body to an inner body, or vice-versa. The bridge structure may extend over a rotor gap in a linear and/or arc-like fashion. The bridge structure may extend from one side to an opposing side of the caliper housing. The bridge structure may be located between opposing sides of the caliper housing. The bridge structure may include one or more reinforcing structures, one or more central portions, one or more outer extensions, one or more through-holes, one or more fastener bores, one or more fasteners, or any combination thereof.

The bridge structure may include one or more reinforcing structures. One or more reinforcing structures may include a single reinforcing structure or a plurality of reinforcing structures. The one or more reinforcing structures may function to prevent displacement of one or more bodies relative to one or more other bodies. Displacement may generally include separation of the outer body from the inner body in a direction away from the rotor or opposite the braking force; separation of the outer body from the inner body in a direction generally perpendicular with the rotational axis of a rotor, which may be referred to as rhombus mode displacement; bending or twisting of the outer body and/or the inner body producing a twisting mode displacement; or any combination thereof. One or more reinforcing structures may extend from one or more bodies. One or more reinforcing structures may extend from an outer body, an inner body, or both. One or more reinforcing structures may extend from an exterior surface and/or an interior surface of one or more bodies. One or more reinforcing structures may be integrally formed and/or affixed to one or more bodies. For example, one or more reinforcing structures may be integral with and extend from an exterior surface of an outer body. One or more reinforcing structures may extend toward one or more bodies, one or more planes, one or more other portions of a bridge structure, or any combination thereof. One or more reinforcing structures may extend toward an inner body, an outer body, a transverse plane, a central portion of a bridge structure, or any combination thereof. One or more reinforcing structures may extend partially or completely the distance from one or more bodies to one or more other bodies, over a rotor gap, or both. One or more reinforcing structures may extend only partially over a rotor gap. One or more reinforcing structures may extend from an outer body toward an inner body, but may not extend completely toward the inner body. The one or more reinforcing structures may taper or increase in thickness and/or height as the reinforcing structure approaches or extends away from one or more bodies. Thickness may be a width of a reinforcing structure measured generally parallel with a transverse plane. Height may be a width of a reinforcing structure measured generally parallel with a longitudinal plane. The one or more reinforcing structures may have or form one or more shapes generally resembling a V, X, W, H, I, the like, or any combination thereof. The one or more reinforcing structures may cooperate with one or more other portions of the bridge structure and/or one or more bodies to form one or more through-holes. Exemplary one or more other portions of the bridge structure may include one or more other reinforcing structures, a central portion, one or more overlapping extensions, or any combination thereof. The one or more reinforcing structures may include one or more ribs, one or more extensions, the like, or any combination thereof.

One or more reinforcing structures may include one or more ribs. The one or more ribs may extend over a rotor gap, from one or more bodies, toward one or more other portions of the bridge structure, toward one or more planes of the caliper housing, toward one or more bodies, or any combination thereof. The one or more ribs may extend partially or completely over a width of a rotor gap. A width of a rotor gap may be defined as the distance between opposing interior surfaces of one or more bodies. The one or more ribs may extend about 10% or greater, about 20% or greater, about 30% or greater, or even about 40% or greater (i.e., from about 40% to about 55%) over a width of the rotor gap. The one or more ribs may extend about 100% or less, about 90% or less, about 80% or less, or even about 70% or less over a width of the rotor gap. The one or more ribs may extend from the outer body toward the inner body. The one or more ribs may or may not extend completely to an inner body from an outer body. The one or more ribs may be integrally formed and/or affixed to one or more bodies. For example, one or more ribs may be integral with and extend from an exterior surface of an outer body. The one or more ribs may extend from any part of an exterior surface of an outer body. The one or more ribs may extend from an exterior surface of an outer body radially outward from one or more interior surfaces, one or more piston bores, one or more mating surfaces, one or more fastener bores, one or more fasteners, one or more mounting bores, or any combination thereof. The one or more ribs may extend from an exterior surface of an outer body between two or more radial outward directions. Two or more radial outward directions may include two or more radial outward directions passing from a rotational axis through one or more one or more ends of the caliper housing, one or more mating surfaces, one or more fastener bores, one or more piston bores, one or more outer circumferences of one or more piston bores, one or more mounting bores, or any combination thereof.

The one or more ribs may extend from an exterior surface of the outer body near one or more planes of the caliper housing, such as the longitudinal plane. One or more ribs may extend parallel, perpendicular, or any angle therebetween relative to one or more interior surfaces and/or planes of the caliper housing. As one or more ribs extend from one or more bodies, the one or more ribs may extend at an angle away from a longitudinal plane and/or an interior surface of a body. The interior surface may be an interior surface of the outer body. The angle one or more ribs extend at may be less than, equal to, or greater than the angle one or more other ribs extend at. The angle one or more ribs extend at may be symmetrical or asymmetrical about one or more planes with the angle one or more other ribs extend at. The angle may be acute, right, obtuse, straight, or any combination thereof. The angle may be measured in a two-dimensional plan view of the caliper housing, such as a top plan view. The angle formed by a rib and a longitudinal plane and/or an interior surface may be about 0° or greater, about 10° or greater, about 20° or greater, about 30° or greater, or even about 40° or greater. The angle formed by a rib and a longitudinal plane and/or an interior surface may be about 90° or less, about 80° or less, about 70° or less, or even about 60° or less. As an interior surface may be generally perpendicular to the longitudinal plane, the angle formed between a rib and a longitudinal plane in addition with the angle formed between a rib and an interior surface may be equal to about 90°. The one or more ribs projecting away from the longitudinal plane at an angle may be particularly useful in preventing displacement of one or more bodies relative to one or more other bodies while allowing for one or more through-holes within the bridge structure.

One or more ribs may be parallel, perpendicular to, or any angle therebetween relative to one or more other ribs. One or more ribs may diverge or converge relative to one or more other ribs, one or more bodies, one or more planes, or any combination thereof. For example, a pair of ribs may diverge from one another as they approach a transverse plane, a central portion, an inner body, or any combination thereof. The pair of ribs may diverge from one another forming an angle therebetween. The angle may be measured in a two-dimensional plan view of the caliper housing, such as a top plan view. The angle formed between the pair of ribs may be about 5° or greater, about 20° or greater, about 30° or greater, or even about 40° or greater. The angle formed between the pair of ribs may be about 120° or less, about 100° or less, about 80° or less, or even about 70° or less. A pair of ribs diverging from one another may be particularly useful in preventing both twisting mode displacement and rhombus mode displacement. A pair of ribs diverging from one another may allow one or more bodies to be smaller than one or more other bodies. For example, the pair of diverging ribs may allow an outer body to be substantially smaller than an inner body. A pair of ribs may converge relative to one another as they approach an outer body or move away from a transverse plane, inner body, central portion, or any combination thereof.

One or more ribs may include one or more, two or more, three or more, or even four or more ribs. One or more ribs may include ten or less, eight or less, or even six or less ribs. One or more ribs may be integral with and/or adjacent to one or more other portions of a bridge structure. One or more portions may include a central portion, an overlapping extension, one or more outer extensions, or any combination thereof. The one or more ribs have a width. The width may a size sufficient so that the one or more ribs function as needed. The width may taper and/or increase along a length of the rib. The one or more ribs may have a width of about 0.5 mm or more, about 1 mm or more, about 2 mm or more, about 5 mm or more, or even about 10 mm or more. The one or more ribs may have a width of about 70 mm or less, about 50 mm or less, about 30 mm or less, or even about 20 mm or less. The one or more ribs have a height. The height may taper and/or increase along a length of the rib. The height of the one or more ribs may be greater over a rotor gap and/or at the transverse plane as the height of the one or more ribs where the rib extend from an inner or outer body. The height of the one or more ribs may increase along a length of the rib by about 2 times or more, by about 5 times or more, by about 10 times or more, or even by about 13 times or more. The height of the one or more ribs may increase along a length of the rib by about 30 times or less, by about 20 times or less, or even by about 17 times or less. One or more ribs may be distanced from one or more extensions, such as to form one or more through-holes.

One or more reinforcing structures may include one or more extensions. The one or more extensions may extend over a rotor gap, from one or more bodies, toward one or more planes of the caliper housing, toward one or more bodies, toward one or more other portions of the bridge structure, toward one or more sides of a caliper housing, away from one or more other reinforcing structures, or any combination thereof. The one or more extensions may extend partially or completely over a width of rotor gap. The one or more extensions may extend about 10% or greater, about 20% or greater, about 30% or greater, or even about 40% or greater over a width of the rotor gap. The one or more extensions may extend about 100% or less, about 90% or less, about 80% or less, or even about 70% or less over a width of the rotor gap. The one or more extensions may extend from the outer body toward the inner body. The one or more extensions may not extend completely to an inner body from an outer body. The one or more extensions may be integrally formed and/or affixed to one or more bodies. For example, one or more extensions may be integral with and extend from an exterior surface of an outer body. The one or more extensions may extend from any part of an exterior surface of an outer body. The one or more extensions may extend from an outer body, between one or more ribs and a side of the outer body. The one or more extensions may extend from an exterior surface of an outer body radially outward from one or more interior surfaces, one or more piston bores, one or more mating surfaces, one or more fastener bores, one or more fasteners, one or more mounting bores, or any combination thereof.

The one or more extensions may extend parallel, perpendicular, or any angle therebetween relative to one or more planes and/or one or more interior surfaces. The one or more extensions may or may not merge or intersect one or more ribs. As one or more extensions extend from one or more bodies, the one or more extensions may extend at an angle away from a longitudinal plane and/or an interior surface of a body. The interior surface may be an interior surface of the outer body. The angle one or more extensions extend at may be less than, equal to, or greater than the angle one or more other extensions extend at. The angle one or more extensions extend at may be symmetrical or asymmetrical about one or more planes with the angle one or more other extensions extend at. The angle may be acute, right, obtuse, straight, or any combination thereof. The angle may be less than, equal to, or larger than an angle at which one or more ribs extend away from the longitudinal plane. The angle may be measured in a two-dimensional plan view of the caliper housing, such as a top plan view. The angle formed by an extension and a longitudinal plane and/or an interior surface may be about 0° or greater, about 10° or greater, about 20° or greater, about 30° or greater, or even about 40° or greater. The angle formed by an extension and a longitudinal plane and/or an interior surface may be about 90° or less, about 80° or less, about 70° or less, or even about 60° or less. As an interior surface may be generally perpendicular to the longitudinal plane, the angle formed between an extension and a longitudinal plane in addition with the angle formed between an extension and an interior surface may be equal to about 90°. The one or more extensions projecting away from the longitudinal plane at an angle may be particularly useful in cooperating with one or more ribs also projecting away from the longitudinal plane in preventing displacement of one or more bodies relative to one or more other bodies while allowing for one or more through-holes to be located between the one or more ribs and one or more extensions.

One or more extensions may be parallel, perpendicular to, or any angle therebetween relative to one or more other extensions. One or more extensions may form an angle with one or more other extensions as the extensions approach one or more bodies, one or more planes, other portions of a bridge structure, or any combination thereof. One or more extensions may angle away from one or more other extensions as the extensions approach an inner body, a central portion of a bridge structure, and/or a transverse plane of a caliper housing. For example, a pair of outer extensions may angle away from each other. The angle may be measured in a two-dimensional plan view of the caliper housing, such as a top plan view. The angle formed between the pair of extensions may be about 5° or greater, about 20° or greater, about 30° or greater, or even about 40° or greater. The angle formed between the pair of ribs may be about 180° or less, about 150° or less, about 100° or less, or even about 70° or less. One or more extensions may be integral with and/or adjacent to one or more other portions of a bridge structure. One or more portions may include a central portion, an overlapping extension, one or more ribs, or any combination thereof. The one or more extensions may cooperate with one or more other portions of the bridge structure to form one or more through-holes. The one or more other portions of the bridge structure may include one or more ribs, a central portion, an overlapping extensions, one or more other reinforcing structures, or any combination thereof.

The bridge structure may include a central portion. The central portion may function to connect one or more reinforcing structures to a body of a caliper, provide structural rigidity to one or more reinforcing structures, prevent displacement of one or more bodies of a caliper housing, or any combination thereof. The central portion may extend from and/or be located adjacent to one or more portions of a bridge structure. The central portion may extend toward and/or be located adjacent to one more other portions of the bridge structure, one or more bodies of a housing, or both. The one or more portions of a bridge structure may include one or more reinforcing structures, an overlapping extension, or both. One or more bodies of a housing may include an inner body, an outer body, or both. For example, a central portion may extend from a plurality of reinforcing structures to an overlapping extension of the bridge structure and an inner body. The central portion may extend over a rotor gap, rotor, or both. The central portion may extend over a portion or all of a width of a rotor gap. The central portion may be located radially outward from the rotor gap, the rotor, or both. The central portion may extend from one side of the caliper housing to an opposing side of the caliper housing. The central portion may be continuous or discontinuous. Discontinuous may mean the central portion may be formed in segments, be separated by one or more through-holes, or both. The central portion may form part of one or more through-holes. The central portion may cooperate with one or more other portions of the bridge to form one or more through-holes. The central portion may include a single central portion or a plurality of central portions. The central portion may include a first central portion, a second central portion, or even more. The central portion may include one or more mating surfaces. For example, if the bridge structure is integral with the outer body, the central portion may include one or more outer mating surfaces. The central portion may extend across all or a portion of a width of the caliper housing. For example, the central portion may extend from one end to an opposing end of the caliper housing. The central portion may extend over the rotor gap in a linear and/or arc-like fashion. The central portion may extend from one side to an opposing side, extend from and/or toward one or more bodies, or any combination thereof in an arc-like fashion over a rotor gap. The central portion may be integral with and/or adjacent to one or more other portions of the bridge structure. One or more other portions may include one or more reinforcing structures, one or more ribs, one or more extensions, one or more overlapping extensions, or any combination thereof The bridge structure may include one or more overlapping extensions. The one or more overlapping extensions may function to extend a bridge structure from over a rotor gap to over one or more bodies of a caliper housing, affix a bridge structure to one or more bodies of a caliper housing, cooperate with one or more fasteners to stiffen the caliper housing and prevent displacement, or any combination thereof. One or more overlapping extensions may be integral with and/or adjacent to one or more portions of a bridge structure. For example, one or more overlapping extensions may be integral with and adjacent to a central portion of the bridge structure. One or more overlapping extensions may be located on an opposing portion of a bridge structure as one or more other portions of the bridge structure. For example, one or more overlapping extensions may be on an opposite side of the central portion as one or more reinforcing structures. One or more overlapping extensions may include any width to affix the bridge structure to a body of the caliper housing. The width of one or more overlapping extensions may be smaller than, equal to, or larger than a width of a central portion of the bridge structure and/or an interior surface of the caliper housing. A width may be a length of one or more overlapping extensions measured generally parallel with a transverse plane and/or an interior surface of one or more bodies and perpendicular to a longitudinal plane. One or more overlapping extensions may be located radially outward from a rotor gap, a rotor, one or more interior surfaces, one or more fastener bores, one or more piston bores, one or more mounting bores, one or more mating surfaces, or any combination thereof. One or more overlapping extensions may be located between two or more radial outward directions. The two or more radial outward directions may include a radial outward direction passing through a rotational axis of the rotor and one or more sides of a caliper housing, one or more fastener bores, and/or one or more piston bore outer circumference. One or more overlapping extensions may include one or more mating surfaces. For example, if the bridge structure extends from the outer body, one or more overlapping extensions may include one or more outer mating surfaces. The one or more mating surfaces may face toward one or more other mating surfaces (i.e., an inner mating surface). One or more overlapping extensions may overlap one or more mating surfaces. One or more overlapping extensions may overlap one or more inner mating surfaces. One or more overlapping extensions may rest atop one or more mating surfaces. One or more overlapping extensions may include one or more fastener bores. One or more overlapping extensions may be secured to one or more bodies via one or more fasteners. One or more overlapping extensions may overlap and rest atop one or more mating surfaces and be secured to the one or more mating surfaces via a plurality of fasteners.

The caliper housing may include one or more through-holes. One or more through-holes may function to allow the rotor gap, rotor, and/or brake pads to be in communication with an ambient environment surrounding a brake assembly to allow for heat dissipation; allow for weight to be reduced from a bridge structure while a plurality of reinforcing structures provide sufficient structural support to prevent displacement; or any combination thereof. One or more through-holes may be located above (i.e., radially outward from) the rotor gap. One or more through-holes may be formed in one or more bodies of a caliper housing, such as an inner body, an outer body, or both. One or more surfaces of one or more bodies may form part of one or more through-holes. For example, one or more through-holes may be formed between an interior surface, exterior surface, or both of one or more bodies and one or more adjacent or opposing surfaces. One or more through-holes may be located in a bridge structure. One or more through-holes may be formed by one or more portions of a bridge structure. One or more portions may include one or more reinforcing structures (e.g., one or more ribs, one or more outer extensions), one or more central portions, one or more overlapping extensions, or any combination thereof. For example, one or more through-holes may be formed by the space between one or more ribs and one or more central portions; the space between one or more ribs and one or more extensions; the space between one or more extensions and one or more central portions; or any combination thereof. One or more through-holes may be formed by an area enclosed by one or more surfaces of one or more portions of a bridge structure, one or more bodies, or any combination thereof. The surfaces of the one or more portions forming the through-hole may be smooth, notched, grooved, stepped, the like, or any combination thereof. For example, one or more surfaces forming a through-hole may be smooth while one or more other surfaces forming the through-hole may have a stepped or grooved surface. One or more through-holes may be located on one or more sides of one or more planes of the caliper housing. One or more through-holes may be located on one or both sides of a transverse plane of the caliper housing. One or more through-holes may be located on one or both sides of a longitudinal plane of the caliper housing. One or more through-holes may be asymmetrical or symmetrical about one or more planes. One or more through-holes may be asymmetrical or symmetrical with one or more other through-holes about one or more planes. A single or aggregate cross-sectional or volumetric area of one or more through-holes passing through or formed in a bridge structure on one side of one or more planes may be smaller than, equal to, or larger than a single or aggregate cross-sectional or volumetric area of one or more other through-holes pass through or formed in a bridge structure on an opposing side of one or more planes. The one or more through-holes may have a cross-sectional area of about 2.25 $cm^2$ or greater, about 5 $cm^2$ or greater, or even about 10 $cm^2$ or greater. The one or more through-holes may have a cross-sectional area of about 50 $cm^2$ or less, about 40 $cm^2$ or less, or even about 30 $cm^2$ or less. The one or more through-holes may encompass a density of the bridge structure, such that a certain percentage of the bridge structure includes one or more through-holes passing therethrough. About 10% or greater, about 20% or greater, or even about 30% or greater of the bridge structure surface area and/or volume may have one or more through-holes passing therethrough. About 75% or less, about 60% or less, or even about 50% or less of the bridge structure surface area and/or volume may have one or more through-holes passing therethrough.

The caliper housing may include one or more fasteners. One or more fasteners may include a single fastener or a plurality of fasteners. The one or more fasteners may function to secure one or more bodies of the caliper housing to one or more other bodies, cooperate with one or more portions of a bridge structure and/or one or more bodies to reinforce the caliper housing to prevent displacement, or any combination thereof. The one or more fasteners may be any fastener capable of securing one or more bodies to one or more other bodies. The one or more fasteners may include one or more mechanical fasteners, adhesive materials, molded fasteners, the like, or any combination thereof. A mechanical fastener may include a threaded fastener, a press-fit fastener, a snap-fit fastener, a staple, the like, or any combination thereof. A threaded fastener may include a screw, a bolt, a stud, a nut, or any combination thereof. An adhesive material may include an adhesive, a sealant, a tape, a material suitable for soldering, or any combination thereof. The adhesive material may include any material suitable for adhering metal to metal. The adhesive may include an epoxy, an acrylic, a urethane, the like, or any combination thereof. A molded fastener may include or be formed by a heat stake, welding, peening, the like, or any combination thereof. One or more fasteners may secure one or more bodies to one or more other bodies. One or more fasteners may secure an outer body to an inner body and/or vice-versa. One or more fasteners may extend partially or through one or more bodies and/or one or more portions of one or more bodies. One or more fasteners may extend partially or entirely through an inner body, an outer body, or both. One or more fasteners may pass through a bridge structure, one or more reinforcing structures, one or more overlapping extensions, one or more mating surfaces, or any combination thereof. One or more fasteners may be perpendicular, parallel, and/or any angle therebetween relative to one or more planes, one or more interior surfaces of one or more bodies, opposing surfaces of a rotor, one or more other fasteners, or any combination thereof. One or more planes may include a transverse plane and/or a longitudinal plane. One or more fasteners may extend into a body at an acute angle, right angle, obtuse angle, or straight angle relative to a longitudinal plane, transverse plane, interior surface of one or more bodies, or any combination thereof. The one or more fasteners may include one or more bridge fasteners, body fasteners, angled fasteners, or any combination thereof.

The one or more fasteners may include one or more bridge fasteners. The one or more bridge fasteners may function to secure one or more overlapping extensions to one or more bodies, provide structural reinforcement to one or more bodies, or both. One or more bridge fasteners may secure one or more overlapping extensions to an inner body. The one or more bridge fasteners may extend entirely through a thickness of one or more overlapping extensions, pass through an inner mating surface, and/or extend partially into the inner body. One or more bridge fasteners may pass through and engage one or more bridge fastener bores. The bridge fastener bores may be formed in the bridge structure, the inner body, an outer mating surface, an inner mating surface, or any combination thereof. The one or more bridge fastener bores may be aligned with one or more other bridge fasteners bores to allow the bridge fasteners to extend therethrough. The one or more bridge fasteners and/or bridge fastener bores may be located radially outward from a rotor, rotor gap, one or more pistons, one or more piston bores, one or more other fasteners and/or fastener bores, one or more interior surfaces, or any combination thereof. The one or more bridge fasteners may be located between two or more radial outward directions. The two or more radial outward directions may include a radial outward direction passing through a rotational axis of the rotor and one or more sides of a caliper housing, one or more fastener bores, one or more piston bore outer circumferences, and/or one or more outer edges of an overlapping extension. The one or more bridge fasteners may be generally parallel, perpendicular, or any angle therebetween relative to one or more other fasteners. The one or more bridge fasteners may be generally perpendicular relative to one or more body fasteners.

The one or more fasteners may include one or more body fasteners. The one or more body fasteners may function to secure one or more bodies to one or more other bodies, provide structural reinforcement to one or more bodies, or both. One or more body fasteners may secure an inner body to the outer body, and/or vice-versa. The one or more body fasteners may pass partially or entirely through one or more bodies. The one or more body fasteners may pass through one or more mating surfaces. For example, one or more body fasteners may extend entirely through the inner body, an inner mating surface, an outer mating surface, and partially into the outer body. One or more body fasteners may pass through and engage one or more body fastener bores. The one or more body fastener bores may be formed in one or more bodies. The one or more body fastener bores may be formed in an inner body, outer body, bridge structure, pass through one or more mating surfaces, or any combination thereof. The one or more body fasteners and/or body fastener bores may be located radially outward from a rotor, rotor gap, one or more pistons, one or more piston bores, one or more other fastener bores, one or more interior surfaces, or any combination thereof. The one or more body fasteners may be located between two or more radial outward directions. The two or more radial outward directions may include a radial outward direction passing through a rotational axis of the rotor and one or more sides of a caliper housing, one or more other fasteners and/or fastener bores, one or more edges or ends of a mating surface, one or more piston bore outer circumferences, and/or one or more outer edges of an overlapping extension.

One or more body fasteners and/or body fastener bores may extend through one or more bodies at angle which is generally parallel, perpendicular, or any angle therebetween relative to one or more planes, one or more interior surfaces of one or more bodies, and/or one or more mating surfaces. The angle may be measured in a two-dimensional cross-section of the caliper housing. For example, the cross-section may be taken along a plane which intersects the one or more body fasteners and is substantially perpendicular with the transverse plane, the longitudinal plane, one or more mating surfaces, one or more interior surfaces, and/or opposing surfaces of a rotor. The angle of a body fastener relative to a transverse plane, interior surface, opposing surfaces of a rotor and/or mating surface may be about 0° or greater, about 20° or greater, about 40° or greater, or even about 50° or greater. The angle of a body fastener relative to a transverse plane, interior surface, opposing surfaces of a rotor and/or mating surface may be about 180° or less, about 150° or less, about 120° or less, or even about 100° or less. The angle of one or more body fasteners may be smaller than, equal to, or greater than the angle of one or more other body fasteners. The angle of one or more body fasteners may be symmetrical or asymmetrical about one or more planes relative to the angle of one or more other body fasteners. One or more body fasteners at an angle between perpendicular and parallel relative to the transverse plane may be referred to as an angled fastener. One or more body fasteners may angle toward one or more planes of the caliper housing as the one or more body fasteners extend through one or more bodies. For example, one or more body fasteners may angle toward a longitudinal plane as the one or more body fasteners pass through an inner body and into an outer body. By extending into one or more bodies at an angle, the one or more body fasteners may provide structural reinforcement to the body allowing the body to be smaller than an opposing body resulting in a light weight caliper housing. For example, the outer body may be smaller than the inner body.

The disclosure relates to a method for forming a caliper housing according to the teachings herein. The present teachings may be performed in virtually any order. One or more features of the caliper housing and/or brake assembly taught herein may be provided. The method may include any or all of the following steps. Forming one or more bodies of a caliper housing. Forming may include machining from billet, casting, forging, the like, or any combination thereof. Forming may include forming one or more bodies separately from one or more other bodies. Forming may include forming an inner body and/or forming an outer body. Forming may include forming one or more bodies with a bridge structure. Forming may include forming an inner body and/or outer body having a bridge structure. Forming may include creating one or more bores in one or more bodies. Creating one or more bores may include machining, drilling, punching, the like, or any combination thereof. Affixing one or more bodies to one or more other bodies. Affixing may include securing an outer body to an inner body, or vice-versa. Affixing may include securing a bridge structure to one or more bodies. Securing may include applying an adhesive, engaging a fastener, welding, soldering, brazing, the like, or any combination thereof. Engaging a fastener may include engaging one or more fasteners with one or more bores. Engaging a fastener may include engaging one or more threaded fasteners with threads of one or more bores. Assembling a caliper housing may include inserting one or more pistons in one or more piston bores; connecting one or more brake fluid lines to the caliper housing; mounting the caliper housing to one or more portions of a vehicle (i.e., securing the caliper housing to a knuckle); locating a rotor within a brake gap, or any combination thereof.

Illustrative Embodiments

Figure 6:
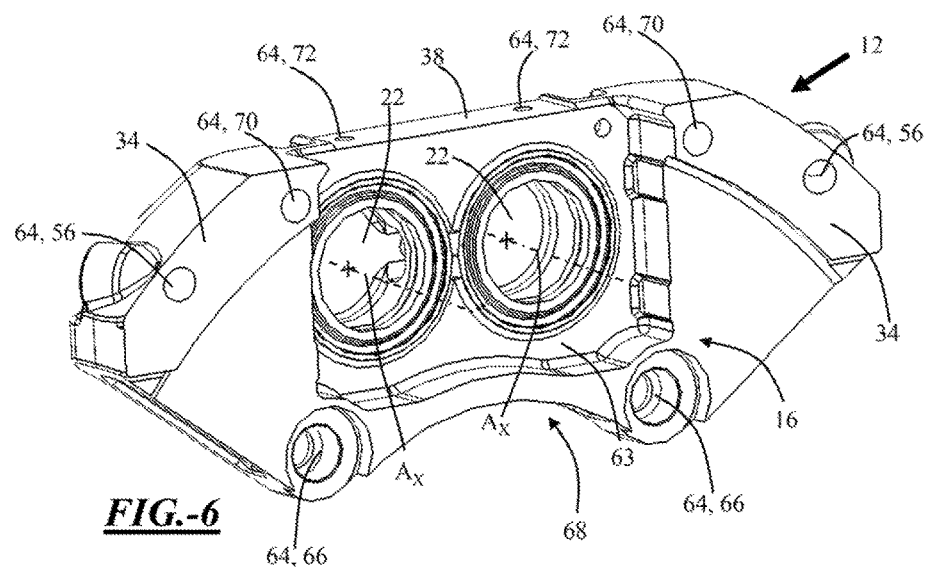
FIG. 6 is a perspective view of the inner surface of an inner body.
Figure 7:
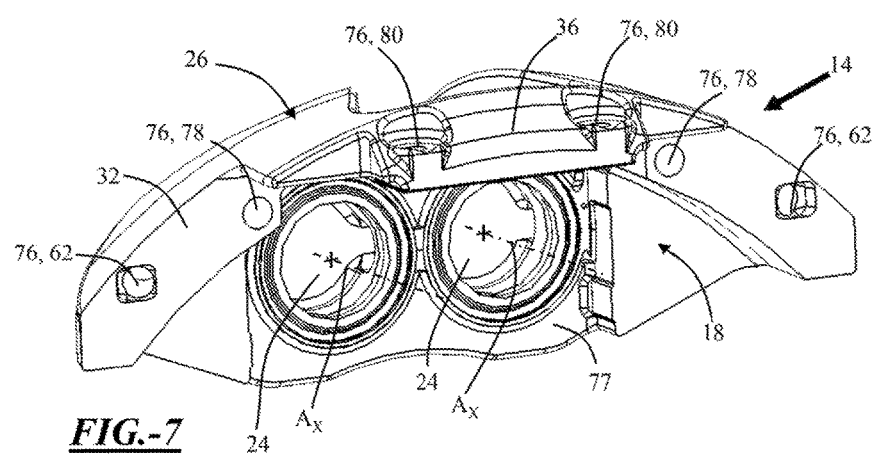
FIG. 7 is a perspective view of the outer surface of an outer body.

FIG. 1 illustrates a caliper housing 10. The caliper housing 10 is a two-piece caliper housing having an inner body 12 mated with an outer body 14. Both the inner body 12 and the outer body 14 include interior surfaces 16, 18 which are opposing and distanced from one another. The distance between the interior surfaces 16, 18 provides a rotor gap 20 for receiving a rotor (not shown) therebetween. When the caliper housing 10 is part of a brake assembly (not shown), the inner body 12 opposes an inner side surface of a rotor (not shown) and the outer body 14 opposes an outer side surface of the rotor (not shown). The inner body 12 includes a plurality of inner piston bores 22 which are open toward the rotor gap 20. The outer body 14 includes a plurality of outer piston bores 24 which are open toward the rotor gap. Each of the plurality of inner and outer piston bores 22, 24 include an axis $A_X$ (as shown in FIGS. 6 and 7) along a length of each of the plurality of inner and outer piston bores 22, 24. The axis $A_X$ is generally perpendicular to the interior surfaces 16, 18 and parallel to a longitudinal plane $P_L$. The caliper housing 10 includes a longitudinal plane $P_L$. The longitudinal plane $P_L$ passes through both the inner body 12 and the outer body 14. The longitudinal plane $P_L$ lies between opposing sides 58, 59 of the caliper housing 10. Perpendicular to the longitudinal plane $P_L$ is a transverse plane $P_T$. The transverse plane $P_T$ is generally parallel to interior surfaces 16, 18 of the inner and outer body 12, 14. A plurality of body fasteners 35 secure the inner body 12 to the outer body 14. A plurality of body fasteners 35 lie in a plane generally perpendicular to both the longitudinal and transverse planes $P_L$, $P_T$.

FIG. 2 shows the outer body 14 is attached to the inner body 12 via a bridge structure 26. The bridge structure 26 is an integral portion of the outer body 14. The bridge structure 26 extends over the rotor gap 20 in an arc-like fashion. The bridge structure 26 connects the outer body 14 to the inner body 12. The bridge structure 26 includes a plurality of reinforcing structures 28. The reinforcing structures 28 extend only partially over the rotor gap 20 and merge into a central portion 30 of the bridge structure 26. The central portion 30 includes a first outer mating surface 32. The first outer mating surface 32 lies in a plane substantially parallel with the transverse plane $P_T$. The first outer mating surface 32 abuts a first inner mating surface 34 of the inner body 12. The first inner mating surface 34 is substantially flush with the first outer mating surface 32. A plurality of body fasteners 35 secure the inner body 12 to the outer body 14. The plurality of body fasteners 35 extend through the inner body 12, the first inner mating surface 34, and the first outer mating surface 32, into the outer body 14. Extending from the central portion 30 is an overlapping extension 36 of the bridge structure 26. The overlapping extension 36 overlaps and rests atop a second inner mating surface 38 (not shown) of the inner body 12. The overlapping extension 36 is secured to the inner body 12 by a plurality of bridge fasteners 40. The plurality of bridge fasteners 40 are generally parallel to both the longitudinal and transverse planes $P_L$, $P_T$. The plurality of bridge fasteners 40 are generally perpendicular to the plurality of body fasteners 35. The plurality of bridge fasteners 40 extend through the overlapping extension 36, through the second inner mating surface 38, and into the inner body 12.

FIG. 3 illustrates the bridge structure 26 of a caliper housing 10. The bridge structure 26 is integral with the outer body 14. The bridge structure 26 extends from the outer body 14 to the inner body 12 to connect the outer body 14 to the inner body 12. The bridge structure 26 includes a plurality of reinforcing structures 28. The reinforcing structures 28 include two ribs 42. The two ribs 42 are integral with and extend from an exterior surface 44 of the outer body 14. The two ribs 42 extend toward the transverse plane $P_T$ and inner body 12. The two ribs 42 extend only partially over the rotor gap 20 and do not extend all the way from the outer body 14 to the inner body 12. The two ribs 42 do not extend beyond the transverse plane $P_T$ toward the inner body 12. The two ribs 42 diverge from one another as they each approach a central portion 30 of the bridge structure 26. The two ribs 42 converge as they approach the outer body 14. The two structures 42 extend away from the longitudinal plane $P_L$ as they each approach the central portion 30. The two ribs 42 diverge at angles $\alpha_1$, $\alpha_2$ from the longitudinal plane $P_L$. The angles $\alpha_1$, $\alpha_2$ are acute angles. The two ribs 42 extend only partially over the rotor gap 20 and then merge with the central portion 30. The two ribs 42 are integral with the central portion 30. The central portion 30 includes a width $W_1$ which extends across the width of the caliper housing 10, from one side 58 to the opposing side 59 and over the rotor gap 20. The central portion 30 is integral with and merges into the overlapping extension 36. The overlapping extension 36 includes a width $W_2$ smaller than the width $W_1$ of the central portion 30. A through-hole 45 into the rotor gap 20 is formed in the bridge structure 26 between the two ribs 42, the central portion 30, and the overlapping extension 36. The through-hole 45 is located on both sides of the transverse plane $P_T$ and longitudinal plane $P_L$.

FIG. 3 further illustrates two outer extensions 46. The two outer extensions 46 are two of the reinforcing structures 28. The two outer extensions 46 extend from an exterior surface 44 of the outer body 14 toward the transverse plane $P_T$ and inner body 12. The two outer extensions 46 extend only partially over the rotor gap 20. The two outer extensions 46 extend generally away from the longitudinal plane $P_L$ as they approach the central portion 30. The two outer extensions 46 extend away from the longitudinal plane $P_L$ at angles $\beta_1$, $\beta_2$ as they approach the transverse plane $P_T$. The two outer extensions 46 are integral with and merge into the central portion 30. Between each of the outer extensions 46 and ribs 42, an outer through-hole 48 into the rotor gap 20 is formed in the bridge structure 26. The two outer through-holes 48 are located on an opposing side of the transverse plane $P_T$ as the inner body 12. Each outer through-hole 48 includes a stepped wall 49 formed by an outer extension 46. The central portion 30 includes two segments, a first central portion 50 and a second central portion 52. The first central portion 50 extends from one side 58 of the caliper housing 10 toward the longitudinal plane $P_L$ and the through-hole 45. The second central portion 52 extends from the opposing side 59 of the caliper housing 10 toward the longitudinal plane $P_L$ and the through-hole 45.

FIG. 4 illustrates a cross-section of caliper housing 10 taken along section A-A (as shown in FIG. 2). The plurality of body fasteners 35 include two angled fasteners 54 through two angled bores 56, 62. The inner body 12 includes two inner angled bores 56 at generally opposing sides 58, 59 of the caliper housing. Each of the two inner angled bores 56 is angled inward from an exterior surface 60 of the inner body 12 toward the longitudinal plane $P_L$ at angles $\delta_1$, $\delta_2$. Each of the two inner angled bores 56 extend from the exterior surface 60 to the first inner mating surface 34. The two inner angled bores 56 are aligned with two outer angled bores 62 of the outer body 14. The two outer angled bores 62 extend from the first outer mating surface 32 into the outer body 14 toward the exterior surface 44 and longitudinal plane $P_L$. The angled bores 56, 62 and angled fasteners 54 allow the caliper housing 10 to have a generally trapezoid-shaped outer periphery 55.

Figure 5:
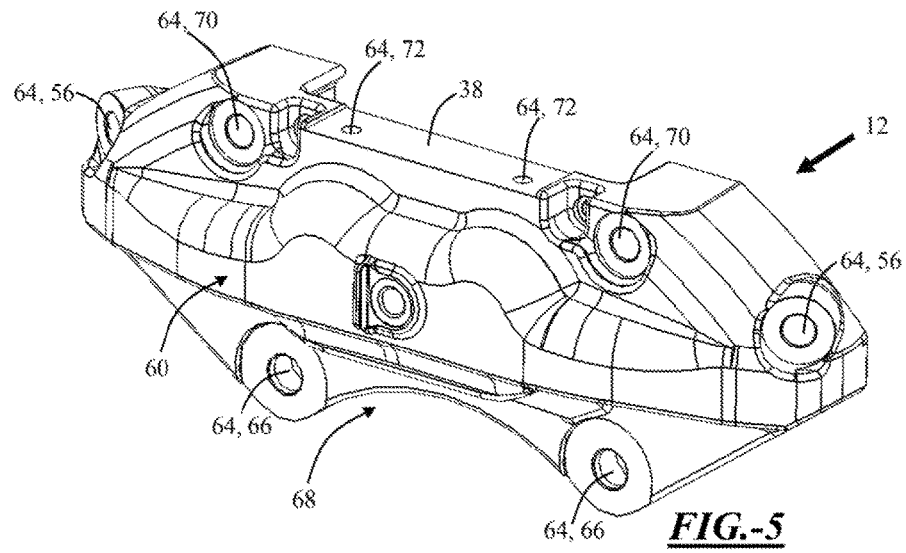
FIG. 5 is a perspective view of the outer surface of an inner body.

FIGS. 5-6 illustrate the inner body 12. The inner body 12 includes an interior surface 16. The interior surface 16 is generally opposite of an exterior surface 60. The interior surface 16 faces inward towards the rotor gap 20 (not shown) when the inner body 12 is assembled to the outer body 14 (not shown). The interior surface 16 includes an inner piston bore surface 63. The inner piston bore surface 63 includes the inner piston bores 22. The inner piston bores 22 are open toward the rotor gap (not shown) and extend toward the exterior surface 60. The inner piston bores 22 each have an axis $A_X$ along their respective lengths. The inner piston bore surface 63 is generally parallel to both the transverse plane $P_T$ (shown in FIG. 1) and the first inner mating surface 34. The first inner mating surface 34 projects away from the inner piston bore surface 63. The first inner mating surface 34 mates with the outer body 14 (not shown) and provides for space between the inner surfaces 16, 18 (not shown) to provide for the rotor gap 20 (not shown). The inner body 12 includes a plurality of bores 64. Two of the bores 64 are mounting bores 66. The mounting bores 66 are located on a lower portion 68 of the inner body 12. The lower portion 68 is generally opposite the second inner mating surface 38. The second inner mating surface 38 is generally perpendicular to the first inner mating surface 34 and both the longitudinal and transverse planes $P_L$, $P_T$. The second inner mating surface 38 includes two longitudinal bores 72 which pass into the inner body 12. The two longitudinal bores 72 are two of the plurality of bores 64. The two longitudinal bores 72 are generally parallel to both the longitudinal plane $P_L$ and the transverse plane $P_T$. The two longitudinal bores 72 receive the second plurality of fasteners 40 (not shown) therein to secure the overlapping extension 36 (not shown) of the outer body 14 to the second inner mating surface 38. Two of the bores 64 are two angled bores 56. The two angled bores 56 pass from the exterior surface 60 through the inner body 12 to the inner first mating surface 34. The two angled bores 56 receive the angled fasteners 54 (not shown) therein to secure the inner first mating surface 34 to the outer first mating surface 32. Two of the bores 64 are straight bores 70. The straight bores 70 pass from the exterior surface 60 through the inner body 12 to the first inner mating surface 34. The straight bores 70 are generally parallel to the transverse plane $P_T$ and the axis $A_X$ of the inner piston bores 22. The straight bores 70 receive two of the first plurality of fasteners 35 to further secure the first inner mating surface 34 to the first outer mating surface 32.

Figure 8:
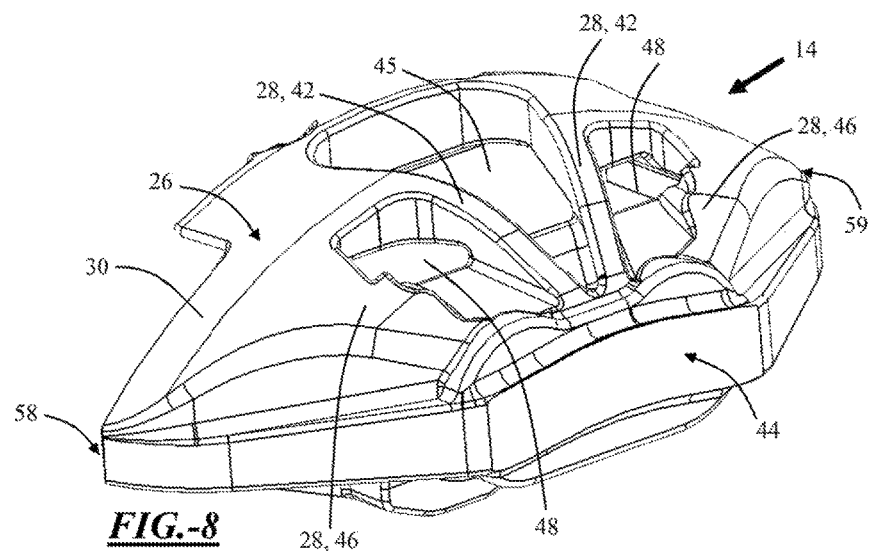
FIG. 8 is a perspective view of the inner surface of an outer body.

FIGS. 7-8 illustrate the outer body 14. The outer body 14 includes an interior surface 18. The interior surface 18 is generally opposite of the exterior surface 44 of the outer body 14. The interior surface 18 faces inward towards the rotor gap 20 (not shown) when the outer body 14 is assembled to the inner body 12 (not shown). The interior surface 18 includes an outer piston bore surface 77. The outer piston bore surface 77 is generally parallel to the transverse plane $P_T$ (shown in FIG. 1) and the first outer mating surface 32. The outer piston bore surface 77 includes the outer piston bores 24. The outer piston bores 24 are open toward the rotor gap 20 (not shown) and extend toward the exterior surface 44. The outer piston bores 24 each have an axis $A_X$ along their respective lengths. Extending from the exterior surface 44 is a bridge structure 26. The bridge structure 26 includes a plurality of reinforcing structures 28. The reinforcing structures 28 include two ribs 42 and two outer extensions 46 which project away from the outer piston bore surface 77. When the outer body 14 is assembled to the inner body 12, the two ribs 42 and two outer extensions 46 extend partially over the rotor gap 20 (not shown) in an arc-like fashion. The reinforcing structures 28 merge into a central portion 30 of the bridge structure 26. The central portion 30 extends from one side 58 to the opposing side 59 of the outer body 14 and caliper housing 10. The central portion 30 is distanced from the interior surface 18 by the plurality of reinforcing structures 26. The distance of the central portion 30 from the interior surface 18 allows the first outer mating surface 32 to be distanced from the interior surface 18. The first outer mating surface 32 distanced from the interior surface 18 provides for space between the interior surfaces 16, 18 to form the rotor gap 20 (not shown).

FIGS. 7-8 further illustrate the first outer mating surface 32 and the overlapping extension 36 include a plurality of bores 76. The plurality of bores 76 include two angled bores 62. The two angled bores 62 extend from the first inner mating surface 32 into the outer body 14. The two angled bores 62 align with the two angled bores 56 of the inner body 12 when the outer body 14 is assembled to the inner body 12. The two angled bores 62 receive the angled fasteners 54 (not shown) to secure the first outer mating surface 32 to the first inner mating surface 34 (not shown). The plurality of bores 76 include two straight bores 78. The two straight bores 78 extend from the first inner mating surface 32 into the outer body 14. The two straight bores 78 are generally perpendicular to the transverse plane $P_T$. The two straight bores 78 align with the two straight bores 70 of the inner body 12 when the outer body 14 is assembled to the inner body 12. The two straight bores 70 receive two of the first plurality of fasteners 35 to further secure the first outer mating surface 32 to the first inner mating surface 34 (not shown). The plurality of bores 76 include two longitudinal bores 80. The two longitudinal bores 80 are formed through the overlapping extension 36. The two longitudinal bores 80 are generally parallel to both the transverse plane $P_T$ and the longitudinal plane $P_L$. The two longitudinal bores 80 overlap and align with the two longitudinal bores 72 of the inner body 12 when the outer body 14 is assembled to the inner body 12. The overlapping extension 36 is part of the bridge structure 26. The overlapping extension 36 is cantilevered and projects away from the first outer mating surface 32 so that the overlapping extension 36 may rest atop the inner body 12 such that the two longitudinal bores 80 of the outer body 12 align with the two longitudinal bores 72 of the inner body 12 to receive bolts (not shown).

Figure 9:
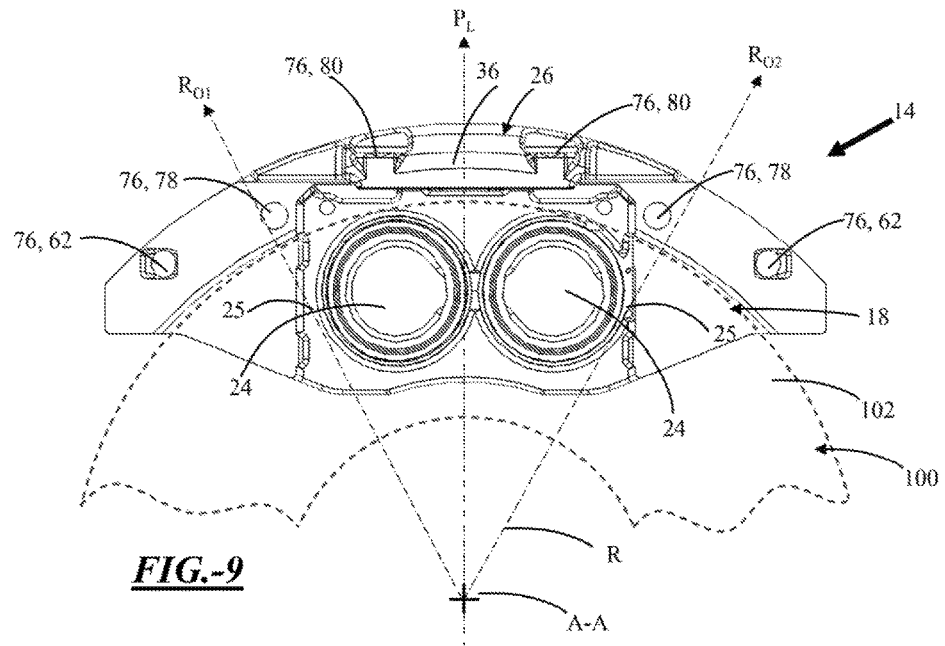
FIG. 9 is a plan view of an interior surface of an outer body relative to a rotor.

FIG. 9 illustrates a plan view of the interior surface 18 of the outer body 14 relative to a rotor 100 of a disc brake. The rotor 100 resides within the rotor gap 20 (not shown). The rotor 100 includes an inner side surface 102 opposing an outer side surface 104 (not shown). The outer piston bores 24 open toward the outer side surface 104 (not shown). The rotor 100 rotates about a rotational axis A-A. The rotational axis A-A is parallel to the longitudinal plane $P_L$. The rotor 100 defines a radial direction R-R which is perpendicular to the rotational axis A-A. A radial outward $R_O$ direction is defined when the radial direction R-R is followed away from the rotational axis A-A. First and second radially outward directions $R_{O1}$ and $R_{O2}$ are defined where the radial direction R-R is followed away from the rotational axis A-A and is tangent with the outer circumference 25 of the outer piston bore 24. The overlapping extension 36 of the bridge structure 26 is located radially outward from the outer piston bores 24 between the first and second radially outward directions $R_{O1}$ and $R_{O2}$. The longitudinal bores 80 are located radially outward from the outer piston bores 24 between the first and second radially outward directions $R_{O1}$ and $R_{O2}$ and extend through the overlapping extension 36 parallel with the longitudinal plane $P_L$. The straight bores 78 are located radially outward from the outer piston bores 24 and are at least partially located between the first and second radially outward directions $R_{O1}$ and $R_{O2}$.

Figure 10:
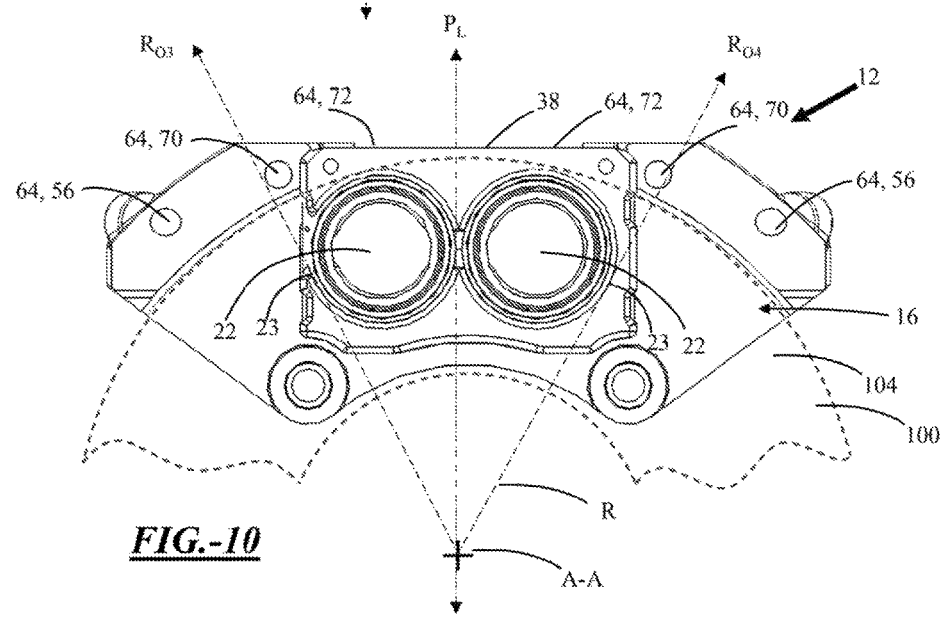
FIG. 10 is a plan view of an interior surface of an inner body relative to a rotor.

FIG. 10 illustrates a plan view of the interior surface 16 of the inner body 12 relative to a rotor 100 of a disc brake. The rotor 100 resides within the rotor gap 20 (not shown). The rotor 100 includes an outer side surface 104 opposing an inner side surface 102 (not shown). The inner piston bores 22 open toward the inner side surface 102 (not shown). The rotor 100 rotates about a rotational axis A-A. The rotational axis A-A is parallel to the longitudinal plane $P_L$. The rotor 100 defines a radial direction R-R which is perpendicular to the rotational axis A-A. A radial outward $R_O$ direction is defined when the radial direction R-R is followed away from the rotational axis A-A. Third and fourth radially outward directions $R_{O3}$ and $R_{O4}$ are defined where the radial direction R-R is followed away from the rotational axis A-A and is tangent with the outer circumference 23 of the inner piston bore 22. The second inner mating surface 38 of the inner body 12 is located radially outward from the inner piston bores 22 between the third and fourth radially outward directions $R_{O3}$ and $R_{O4}$. The longitudinal bores 72 are located radially outward from the inner piston bores 22 between the third and fourth radially outward directions $R_{O3}$ and $R_{O4}$ and extend through the second inner mating surface 38 parallel with the longitudinal plane $P_L$. The straight bores 70 are located radially outward from the inner piston bores 22 at least partially between the third and fourth radially outward directions $R_{O3}$ and $R_{O4}$.

Figure 11:
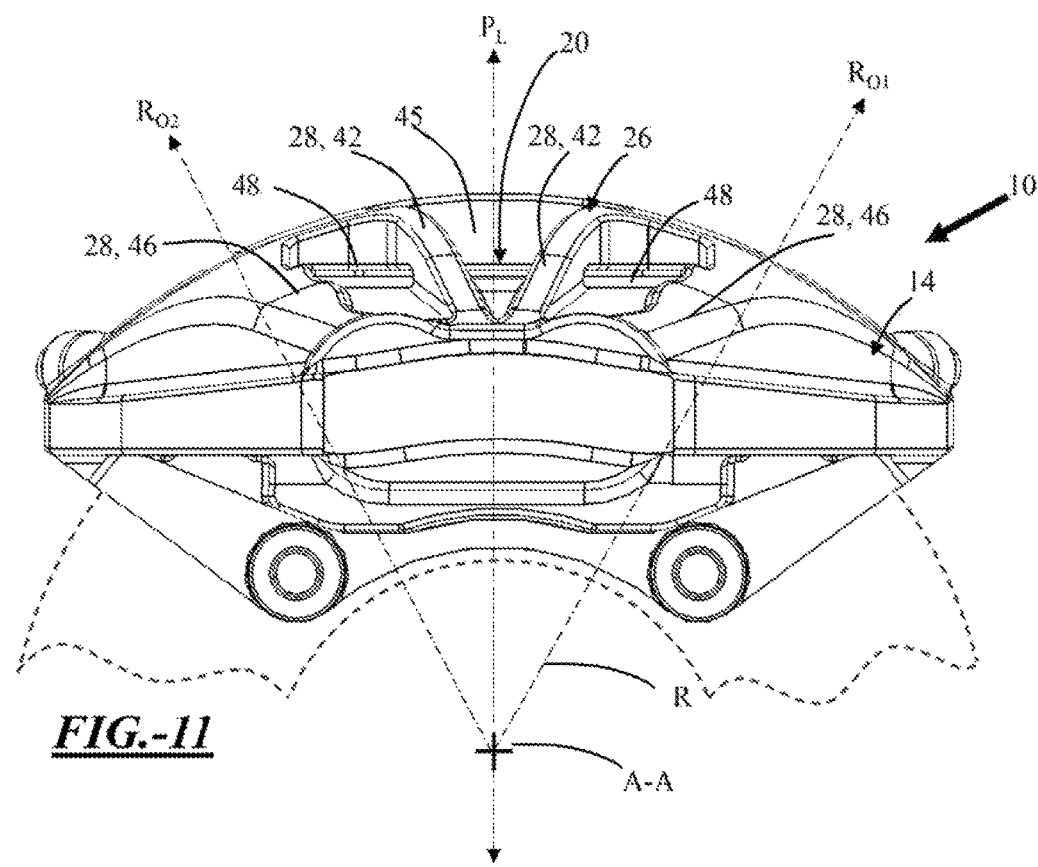
FIG. 11 is a front plan view of a caliper housing relative to a rotor.

FIG. 11 illustrates a caliper housing 10 having a bridge structure 26 as part of the outer body 14. FIG. 11 illustrates the first and second radially outward directions $R_{O1}$ and $R_{O2}$ as described in FIG. 9 relative to the outer piston bores 24. The plurality of reinforcing structures 28 are located radially outward from the piston bores 24. The ribs 42 are located radially outward from the piston bores 24 between the first and second radially outward directions $R_{O1}$ and $R_{O2}$. The through-hole 45 is located radially outward from the piston bores 24 between the first and second radially outward directions $R_{O1}$ and $R_{O2}$ with the longitudinal plane $P_L$ intersecting therethrough. The through-hole 45 places the rotor gap 20 in communication in the radial direction R-R with the exterior of the caliper housing 10. The outer extensions 46 are located radially outward from the piston bores 24 being at least partially between the first and second radially outward directions $R_{O1}$ and $R_{O2}$. The outer through-holes 48 are formed between a rib 42 and outer extension 46. The outer through-holes 48 are radially outward from the outer piston bores 24 and between the first and second radially outward directions $R_{O1}$ and $R_{O2}$. The outer through-holes 48 place the rotor gap 20 in communication in the radial direction R-R with the exterior of the caliper housing 10.

REFERENCE NUMERAL LISTING

10 Caliper housing
12 Inner body
14 Outer body
16 Interior surface of inner body
18 Interior surface of outer body
20 Rotor gap
22 Inner piston bores
23 Outer circumference of inner piston bore
24 Outer piston bores
25 Outer circumference of outer piston bore
26 Bridge Structure
28 Plurality of reinforcing structures
30 Central portion of bridge structure
32 First outer mating surface
34 First inner mating surface
35 First plurality of fasteners
36 Overlapping extension of bridge structure
38 Second inner mating surface of inner body
40 Second plurality of fasteners
42 Ribs
44 Exterior surface of outer body
45 Through-hole
46 Outer extensions
48 Outer through-hole
49 Stepped wall of outer through-hole
50 First central portion
52 Second central portion
54 Angled fasteners
55 Outer periphery of housing
56 Angled bores of inner body
58 Side of caliper housing
59 Opposing side of caliper housing
60 Exterior surface of inner body
62 Angled bores of outer body
63 Inner piston bore surface
64 Plurality of bores of inner body
66 Mounting bores of inner body
68 Lower portion of inner body
70 Straight bores of inner body
72 Longitudinal bores
76 Plurality of bores of outer body
77 Outer piston bore surface
78 Straight bores of outer body
80 Longitudinal bores
100 Rotor
102 Inner side surface of rotor
104 Outer side surface of rotor
A-A Rotational axis of rotor
R-R Radial direction
$R_{O1}$ First radially outward direction
$R_{O2}$ Second radially outward direction
$R_{O3}$ Third radially outward direction $R_{O4}$ Fourth radially outward direction
$W_1$ Width of central portion
$W_2$ Width of overlapping extension
$P_T$ Transverse plane
$P_L$ Longitudinal Plane
$A_X$ Axis of piston bores As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition." Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for aid purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the disclosure should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A brake caliper housing comprising:
   (a) an inner body having one or more inner piston bores open toward a rotor gap;
   (b) an outer body having:
      (i) one or more outer piston bores open toward the rotor gap;
      (ii) a bridge structure which extends over the rotor gap; and
      (iii) a plurality of reinforcing structures which are part of the bridge structure and extend only partially over the rotor gap, wherein the plurality of reinforcing structures include: at least two ribs which diverge from one another and away from a longitudinal plane as the at least two ribs extend over the rotor gap, and two outer extensions at opposing ends of the brake caliper housing which angle away from the longitudinal plane as the two outer extensions extend over the rotor gap;
   wherein the longitudinal plane passes through both the inner body and the outer body;
   wherein the plurality of reinforcing structures extend at an angle away from the longitudinal plane as the plurality of reinforcing structures extend from an exterior surface of the outer body over the rotor gap;
   wherein the plurality of reinforcing structures are integral with a central portion of the bridge structure which extends from one side to an opposing side of the brake caliper housing and over the rotor gap,
   wherein an overlapping extension extends from the central portion and is located atop the inner body and secures the inner body to the outer body, and
   wherein one or more bridge fasteners parallel to the longitudinal plane secure the bridge structure to the inner body so that the bridge structure connects the outer body to the inner body.

2. The brake caliper of claim 1, wherein the bridge structure includes a plurality of through-holes formed by the plurality of reinforcing structures; and
   wherein the plurality of through-holes are located radially outward from the one or more outer piston bores and between two radially outward directions tangent with a circumference of the one or more outer piston bores.

3. The brake caliper housing of claim 1, wherein a mating surface of the inner body is flush with a mating surface of the outer body and a plurality of fasteners pass through both mating surfaces to secure the inner body to the outer body.

4. The brake caliper housing of claim 3, wherein the mating surfaces of both the inner body and the outer body are generally perpendicular to the longitudinal plane and generally parallel to interior surfaces of both the inner body and the outer body.

5. The brake caliper housing of claim 4, wherein the outer body includes a pair of angled bores which pass from the mating surface of the outer body toward the exterior surface of the outer body and are aligned with the pair of angled bores of the inner body; and wherein a pair of angled fasteners reside within the pair of angled bores of both the inner body and outer body to secure the inner body to the outer body.

6. The brake caliper housing of claim 5, wherein the brake caliper housing has a substantially trapezoid shaped cross-section and the cross-section intersects the pair of angled bores and pair of angled fasteners of the inner body and the outer body.

7. A brake caliper housing comprising:
(a) an inner body having one or more inner piston bores open toward a rotor gap;
(b) an outer body having:
 (i) one or more outer piston bores open toward the rotor gap;
 (ii) a bridge structure which extends over the rotor gap; and
 (iii) a plurality of reinforcing structures included in the bridge structure;
  wherein a longitudinal plane passes through both the inner body and the outer body;
  wherein the plurality of reinforcing structures extend at an angle away from the longitudinal plane as the plurality of reinforcing structures extend from an exterior surface of the outer body over the rotor gap; and
  wherein one or more bridge fasteners parallel to the longitudinal plane secure the bridge structure to the inner body so that the bridge structure connects the outer body to the inner body;
  wherein a mating surface of the inner body is flush with a mating surface of the outer body and a plurality of fasteners pass through both mating surfaces to secure the inner body to the outer body;
  wherein the mating surfaces of both the inner body and the outer body are generally perpendicular to the longitudinal plane and generally parallel to interior surfaces of both the inner body and the outer body; and
  wherein the inner body includes a pair of angled bores which pass from an exterior surface of the inner body to the mating surface of the inner body and angle toward the longitudinal plane.

8. The brake caliper housing of claim 7, wherein the plurality of reinforcing structures include at least two ribs which diverge from one another and away from the longitudinal plane as the at least two ribs extend over the rotor gap.

9. The brake caliper housing of claim 8, wherein the plurality of reinforcing structures are part of the bridge structure and extend only partially over the rotor gap.

10. The brake caliper housing of claim 9, wherein the plurality of reinforcing structures include two outer extensions at opposing ends of the brake caliper housing which angle away from the longitudinal plane as the two outer extensions extend over the rotor gap.

11. The brake caliper housing of claim 10, wherein the plurality of reinforcing structures extend away from the longitudinal plane at an acute angle.

12. The brake caliper housing of claim 10, wherein the plurality of reinforcing structures are integral with a central portion of the bridge structure which extends from one side to an opposing side of the brake caliper housing and over the rotor gap.

13. The brake caliper housing of claim 12, wherein an overlapping extension extends from the central portion and is located atop the inner body and secures the inner body to the outer body.

14. A brake caliper housing comprising:
(a) an inner body having one or more inner piston bores open toward a rotor gap;
(b) an outer body having:
 (i) one or more outer piston bores open toward the rotor gap; and
 (ii) a bridge structure which extends over the rotor gap; and
 (iii) a plurality of reinforcing structures included in the bridge structure;
  wherein a longitudinal plane passes through both the inner body and the outer body;
  wherein the bridge structure includes at least two ribs which extend from an exterior surface of the outer body toward the inner body and diverge away from one another at an acute angle relative to the longitudinal plane;
  wherein the at least two ribs extend only partially over the rotor gap;
  wherein one or more bridge fasteners parallel to the longitudinal plane secure the bridge structure to the inner body so that the bridge structure connects the outer body to the inner body,
  wherein the bridge structure includes a central portion which extends from one side to an opposing side of the break caliper housing and over the rotor gap;
  wherein the at least two ribs extend from the exterior surface of the outer body and merge with the central portion; and
  wherein an overlapping extension extends from the central portion and is located atop the inner body and a pair of fasteners pass through the overlapping extension into the inner body to secure the outer body to the inner body.

15. The brake caliper housing of claim 14, wherein the inner body includes a pair of angled bores which pass from an exterior surface of the inner body to a mating surface of the inner body and angle toward the longitudinal plane; and
wherein the outer body includes a pair of angled bores which pass from a mating surface of the outer body toward the exterior surface of the outer body which are aligned with the angled bores of the inner body.

16. The brake caliper housing of claim 14, wherein a pair of angled fasteners reside within the angled bores of both the inner body and the outer body and secure the inner body to the outer body.

17. The brake caliper housing of claim 16, wherein the brake caliper housing has a substantially trapezoid shaped cross-section and the cross-section intersects the pair of angled bores and pair of angled fasteners of the inner body and the outer body.

18. The brake caliper housing of claim 14, wherein the plurality of reinforcing structures include two outer extensions at opposing ends of the brake caliper housing which angle away from the longitudinal plane as the two outer extensions extend over the rotor gap.

19. The brake caliper housing of claim 14, wherein the bridge structure includes a plurality of through-holes formed by the plurality of reinforcing structures.

20. The brake caliper housing of claim 19, wherein the plurality of through-holes are located radially outward from the one or more outer piston bores and between two radially outward directions tangent with a circumference of the one or more outer piston bores.

\* \* \* \* \*